Feb. 27, 1962 C. C. CLOUGH 3,022,757
TANK HEAD DISHING MECHANISM
Filed April 22, 1960 3 Sheets-Sheet 1
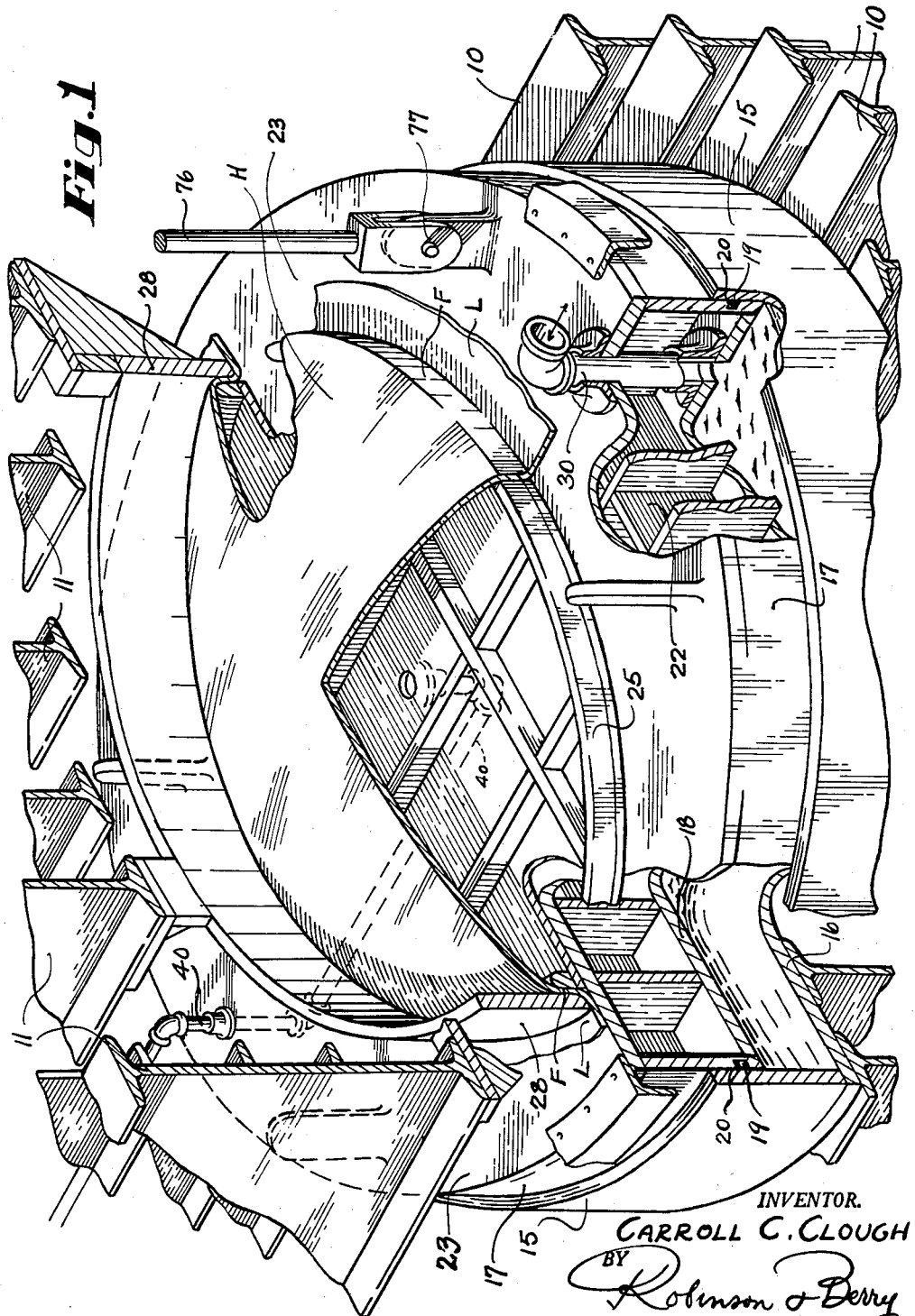
INVENTOR.
CARROLL C. CLOUGH
BY
Robinson & Berry
ATTORNEYS Feb. 27, 1962   C. C. CLOUGH   3,022,757
TANK HEAD DISHING MECHANISM
Filed April 22, 1960   3 Sheets-Sheet 2
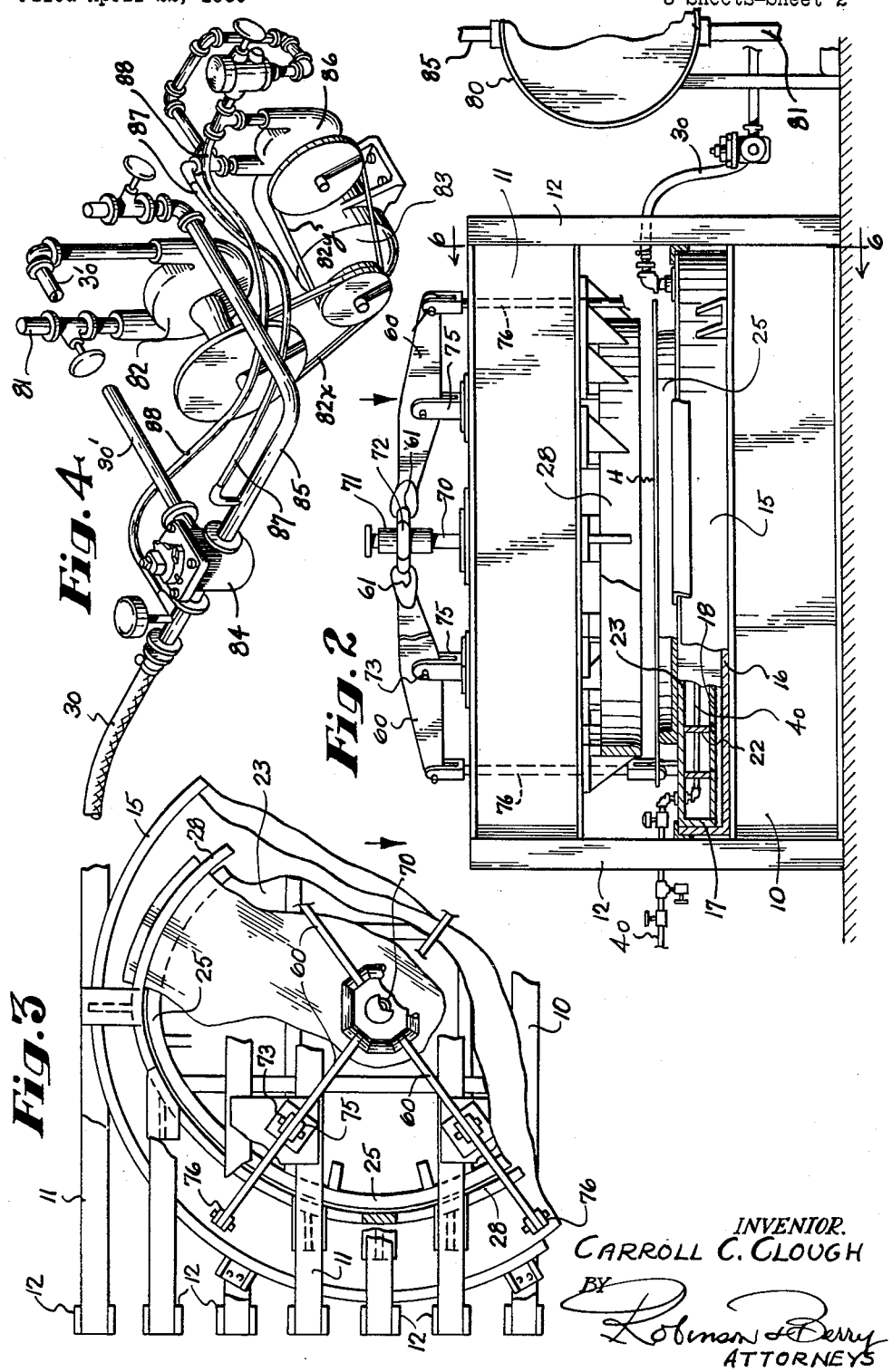
INVENTOR.
CARROLL C. CLOUGH
BY
Robinson & Berry
ATTORNEYS

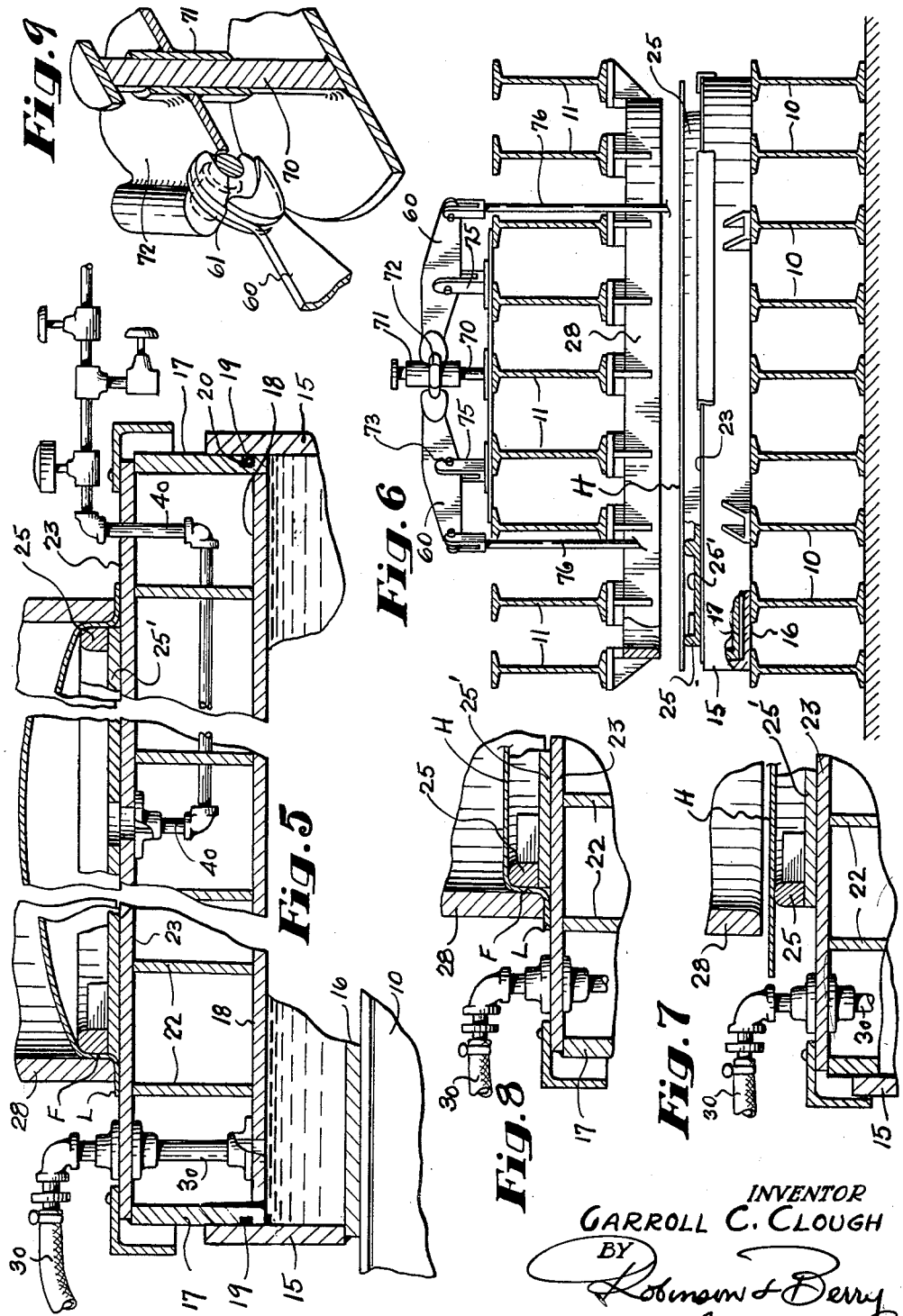

United States Patent Office 3,022,757
Patented Feb. 27, 1962

3,022,757
TANK HEAD DISHING MECHANISM
Carroll C. Clough, 2739 6th Ave. S., Seattle, Wash.
Filed Apr. 22, 1960, Ser. No. 23,949
6 Claims. (Cl. 113—44)

This invention relates to mechanisms for the dishing of tank heads and the like. More particularly it relates to a mechanism for the dishing of unround metal tank heads without the use of the usually employed coacting upper and lower forming dies that act directly on each head to give it a definite and predetermined extent of dishing.

Explanatory to the reasons for and advantages residing in the present head dishing mechanism, it will here be stated that present day dishing of heads that are elliptical, oval or other than round shapes, is generally accomplished by using opposedly related or coacting dies in conjunction with a hydraulically operated press. The formation of or dishing of tank heads by this means invariably stretches the inner areas thereof and shrinks the outer areas. This result is detrimental, objectionable and unsatisfactory.

Another present day method of dishing tank heads is carried out by use of small upper and lower coacting dies in conjunction with a small press brake, or the like, having an up and down action that gradually or progressively accomplishes the dishing by a series of up and down movements of the top die. This method, also, results in stretching the inner area and shrinking the outer areas of the heads with detrimental and undesirable results.

In view of the disadvantages and undesirable results of the above mentioned present day methods of head plate dishing, it has been the principal object of the present invention to provide a novel mechanism, and procedure, adapted for the dishing of blanked out head plates of various shapes and sizes without the use of the usual upper and lower, or opposedly related forming dies and whereby perfectly dished heads, that are uniformly stretched throughout their dished areas and are free of marks, scratches or other defects, will be produced; the present operation being designed primarily for metal heads of steel or aluminum, but not necessarily confined to metal or to any specific kinds of metal.

It is a further object of the present invention to provide a forming mechanism which, by reason of its particular construction and mode of operation, will produce stronger and more satisfactory heads than are produced by those present day means and methods previously mentioned.

More specifically stated, the present invention resides in the provision of a head dishing mechanism having coacting head plate holding dies, one of which is mounted on and is movable by means of a hydraulically actuated piston to clamp only the peripheral edge portion of the head plate to be dished between the dies for its peripheral flanging and for the securing of the clamped peripheral edge portion of the blanked out head to the piston end in an air tight joint, and therein means is provided for the controlled application of air under pressure between the piston head and clamped head plate to effect the dishing of the plate to the specified or desired extent.

Further objects and advantages of the present invention reside in the details of construction of parts; in their coacting and assembled relationship and in the mode of use of the mechanism for the head dishing operation, as will hereinafter be described.

In accomplishing the above mentioned and other objects and advantages of the invention, I have provided the improved details of construction, the preferred forms of which are illustrated in the accompanying drawings, wherein:

FIG. 1 is a perspective view of the head dishing machine of the present invention with parts broken away for explanatory purposes and better understanding.

FIG. 2 is an elevation of the mechanism in its open position, and showing a head plate blank as positioned for being clamped in position for dishing.

FIG. 3 is a fragmental top or plan view of the machine.

FIG. 4 is a perspective view of devices embodied by the hydraulic system.

FIG. 5 is a vertical section taken diametrically of the cylinder and piston in the operation of holding the head plate during the dishing operation.

FIG. 6 is a cross-section of the mechanism taken on line 6—6 in FIG. 2.

FIG. 7 is an enlarged sectional detail of a portion of the head plate clamping dies with plate placed between them preparatory to being clamped.

FIG. 8 is a sectional view showing the clamping dies as clamped for flanging and securing the head plate.

FIG. 9 is a sectional detail, in perspective, of a part of the pressure equalizer means.

Referring more in detail to the drawings:

It is to be understood that the present machine may be adapted for the dishing of heads that are cricular, oval or elliptical, as applied to the ends of tanks as used for the transportation of gasoline, oil, milk or for fluid materials such as dry granular sugar, cement, etc. In the present drawings, I have illustrated the mechanism as designed for the dishing of elliptical heads. However, it is to be understood that this mechanism can be modified as required, to accommodate heads of any of the various other shapes desired merely by a change of head clamping dies.

The present machine comprises a rigid and substantial frame structure that is here shown best in FIGS. 2, 3 and 6, to comprise a succession of horizontal, parallel and transversely disposed base beams 10 and a similar succession of horizontally disposed upper or top beams 11; corresponding beams of the lower and upper groups being joined at their ends by vertical, tie straps 12 of substantial strength which hold the upper and lower groups of beams in the vertically spaced relationship shown in FIGS. 2 and 6 to receive the head plates endwise between them for dishing; an open end of the machine being shown in FIG. 6.

Fixed horizontally upon the top edge surfaces of the lower series of base beams 10, is a shallow cylinder 15 that is closed at its lower end by a bottom wall or head 16. Reciprocally fitted in the cylinder 15 is a piston 17. This is closed at its lower end by a horizontal plate 18. Sealing of the piston with the sidewalls of the cylinder is effected by use of an O-ring 19 applied within an encircling groove 20 formed in the piston wall as has been best illustrated in FIG. 5, thus to sustain the hydraulic pressure medium that is to be applied between the closing lower end wall 18 of the piston and the closing lower end wall 16 of the cylinder, as will presently be explained.

The piston 17 is strengthened by a grid 22 formed of suitable cross beams 22 as shown in FIGS. 1 and 5 and fixedly mounted thereon is a horizontal top plate 23.

Mounted symmetrically on the plate 23, as fixedly mounted on the upper end of the piston, is an elliptical die 25. This has a supporting base flange 25' disposed flatly upon the plate 23 as applied to the upper end wall of the piston 17. This die is arranged to coact with a similarly elliptical female die 28 cooperatively fixed, as in FIG. 6, to the under surface of the upper horizontal series of beams 11. These dies conform to the desired shape of the head plate that is to be dished.

When the piston 17 is in its retracted or lowered position, as shown in FIGS. 2 and 6, the dies 25 and 28 are vertically spaced and a head plate that is to be dished can then be positioned between them, rested upon the lower die 25 preparatory to its peripheral flanging for its securement for dishing.

A head plate to be dished is designated herein by reference character H and it has been shown in FIGS. 2, 6 and 7, as symmetrically positioned on the bottom die 25 preparatory to being flanged and clamped for dishing.

The upward movement of the lowered or retracted piston 17 from the cylinder 15 is effected by the application of a suitable hydraulic pressure medium, such as oil, into the pressure chamber that is formed between the lower end closing wall 16 of the cylinder and the lower end wall 18 of the piston. For this purpose, a pressure pipe line 30 suitable for conveyance of the pressure medium leads downwardly through the piston and opens into the cylinder as shown best in FIG. 5.

The lifting of the piston by an application of pressure medium to the cylinder 15 through pipe line 30 lifts the head plate, as placed for dishing, symmetrically on the male die, 25, against the female die 28, forcing it thereinto as shown in FIG. 8, thus providing the peripheral portion of the head plate with a down-turned, right angle peripheral flange F about its lower end. This flange F is of such extent that it is caused by the coacting dies 25 and 28 to terminate in an outwardly formed lip, L. The full lifting of the piston 17 forces the head plate into the female die with such tightness that the joint between head plate flange and dies is positively sealed entirely about the periphery of the plate and the plate edge is securely anchored by the flange and lip against release while the dies are so closed together as has been shown in FIGS. 5 and 8.

With the head plate H so secured, the plate dishing operation can then be carried out to the extent desired, or provided for by admittance of air under pressure to the sealed pressure chamber that is formed between the die mounting plate 23 on the top end of piston 17 and the secured head H; air being delivered into this sealed space under the desired pressure, through a pipe line 40 that leads downwardly into the piston, as in FIG. 5, and then turns upwardly within it to discharge into the sealed pressure chamber. The pressure of air in the chamber can be so supplied as to cause the upward dishing of the head plate to the desired or a predetermined extent. This head dishing is accomplished by a uniform stretching of the plate over the entire area of its dished portion, avoiding scratches, distortion and die marks.

In the opening of the dies after dishing, the head will move free of the top die with the lowering of the piston. When the piston has been sufficiently lowered for clearance, the head can be raised from the lower die 25 and then readily removed endwise from an open end of the machine. After the head has been removed from the machine the lip portion L formed about the lower end periphery of the flange F can be cut away, leaving the peripheral flange for securement of the head in the end of a tank body in the usual way. The dished head in its finished form would be as indicated in FIG. 1.

In order to insure even or equalized extending movement of the piston 17 without tilt or binding, regardless of any variation in resistance to its extending movement at different locations about its periphery, I have applied a plurality of equalizing lever arms 60 radially of the machine above the top series of frame beams 11. It is shown in FIGS. 2, 3 and 6, that a post 70 is fixed vertically upon the upper beam structure, centrally thereof. Slidably fitted to this post is a cylindrical sleeve 71 provided with an encircling flange 72. The lever arms 60, here shown to be four in number and equally angularly spaced, extend radially from the post. Each lever is pivotally supported medially of its ends, as at 73 from a standard or bracket 75 fixed to the beams 11. At their inner ends, each lever 60 has a slot or seat 61 providing a pivotal connection with the flange 72 of sleeve 71 and at its outer end is pivotally connected by a vertical link 76 with the peripheral portion of the piston head as shown at 77 in FIGS. 1 and 2. Thus, the upward movement of any segmental portion of the piston acts through the corresponding lever 60 to move the sleeve 71 downwardly and, through the other levers, to lift those parts of the cylinder with which they are connected, thus to maintain its level at all times and avoid any possibility of its tilting or binding in the cylinder at any points of its circumference.

The hydraulic system for the present machine is shown in FIG. 4. A storage tank 80 is shown in FIG. 2 for the selected hydraulic medium. This tank has a pipe connection 81 leading therefrom to the intake side of a high volume low pressure pump 82 that has a belt drive connection 82x with an electric motor 83. The outlet side of pump 82 is connected by a pipe 30' with a three-way valve 84 from one side of which valve the pipe line 30 leads to the cylinder 15. A return flow pipe 85 leads from valve 84 to tank 80. Also there is a low volume, high-pressure pump 86 with a driving belt connection 82y with electric motor 83. This has an inlet pipe connection 87 with pipe 85 and a discharge pipe connection 88 leading to the pipe line 30.

Fluid can circulate from the low pressure pump 82, through 3-way valve 84, back into tank 80. And high pressure fluid can be drawn from pipe 85 by pump 86 and discharged under high pressure to line 30.

The mode of operation is substantially as follows: First, the piston 17 is lowered, by allowing return flow of pressure medium to tank 80, for reception of a head H between the dies 25 and 28. The plate is placed in position and pump 82 is then set in motion to deliver medium through pipe 30', valve 84 and pipe line 30 to the cylinder to cause lifting of the piston and the pressing of the head plate against the female die 28 as in FIG. 8. The valve 84 is then adjusted to permit circulation through pipes 30', valve 84 and return pipe line 85. The high pressure pump is then cut in to draw medium from pipe 85 and deliver it under high pressure to pipe line 30, thus to cause the piston to press die 25 and head plate H into the female die as in FIG. 8 and the incident flanges of its peripheral edge. Then, while the head plate is tightly fixed within the dies, air under pressure is admitted from pipe line 40 under a regulated or predetermined pressure, to the sealed air chamber between the top of the lower die and head plate to effect the upward dishing of the plate to the desired extent. This may be judged by visual inspection or mechanical signal. Air is then exhausted from the pressure chamber and the hydraulic medium is pumped back to the storage tank 80. The dished head is then lifted from the male die and removed from the machine, thus leaving the machine in readiness for the next head dishing operation.

Male and female dies, for heads of different size and shape, may be interchangeably used in this machine and pressure used for piston action and for head dishing can be varied to suit the particular jobs being done.

The advantages of use of this mechanism can be briefly summarized as follows:

The pressure at which the hydraulic medium is applied for piston operation, for flanging and securement of the head plates, is relatively low. Air pressure required for effecting the plate dishing operation likewise is relatively low.

The head holding dies not only provide or form the usually required flange on the dished head for its subsequent securement in the tank body, but also form the securing lip on the lower end of the flange, that aids in securing the head under the force of the air pressure applied for dishing.

Different sizes and shapes of dies for flanging and securement of the head plate for dishing can be constructed at very reasonable costs, and interchangeably used.

The relatively high costs for the pressure dishing of heads of unround formation is avoided.

Dished heads, as formed by the present machine, are free of scratches or die marks, and are stronger due to the uniform stretching of the heads.

The dishing operation is more economically performed at greater speed and with greater satisfaction in its final results.

I claim:

1. A tank head dishing and flanging mechanism comprising a main frame including a base structure and an interconnected top structure, an upwardly opening cylinder mounted on the base structure, a piston with a top end closing wall mounted in said cylinder and extendable upwardly therefrom, a removable plate mounted on said end wall, a first annular flange formed on said plate about the peripheral edge thereof and extending upwardly therefrom, a second annular flange mounted by said top structure and extending downwardly therefrom, said second flange surrounding a greater area than said first flange whereby the first flange may be positioned within second flange in close but spaced relationship, means for controlling the application of a fluid pressure medium to and for its release from the cylinder to effect the extending and retracting of the piston, said first flange providing means for supporting a head plate to be dished in spaced relationship above said removable plate, said second flange being adapted, upon the extending of the piston with a head plate of appropriate size concentrically positioned on said first flange, to engage against the top surface of the head plate and bend the peripheral edge portion of said head plate downwardly about said first flange and to cause the edge portion of the head plate to engage about its outer edge against the top end wall of the piston outwardly from said first flange, and thereby form an annular lip completely about the periphery of said head plate and said annular lip on the head plate being in parallel engagement with said top end wall and secured in fluid tight condition against said top end wall and means for controlling the application of a fluid pressure medium to the sealed space between the removable plate and the adjacent surface of said head plate.

2. A tank head dishing and flanging mechanism as in claim 1 wherein the fluid pressure medium that is applied to the cylinder is applied through a conduit that leads to the cylinder through the piston.

3. A tank head dishing and flanging mechanism as in claim 1 wherein the fluid pressure medium that is applied to the sealed space is applied through a conduit that leads downwardly into the piston and then upwardly through the end wall of said piston and through the removable plate to said sealed space.

4. A tank head dishing and flanging mechanism as in claim 1 including stabilizing means mounted by said top structure and interconnected to said piston to provide equal travel of said piston about its periphery in the upward movement thereof.

5. The mechanism recited in claim 4 wherein said stabilizing means comprises a post that is fixed to the top of said top structure in the axial line of the piston, a sleeve slidably fitted to said post for travel therealong, a plurality of lever arms of equal length etxended radially of the post at equal angular intervals and pivotally supported at equal distances from the post on said top structure, each lever having a pivotal connection at its inner ends with its respective sleeve and a link connecting the outer ends of each lever with the piston at equal distances from the center of the piston at angular intervals corresponding to the spacing of said levers.

6. The mechanism recited in claim 5 wherein the means for applying fluid pressure medium to the cylinder comprises a low pressure, high volume pump for its initial closing travel, and a high pressure, low volume pump for its head plate flanging movement.

References Cited in the file of this patent

UNITED STATES PATENTS

| | | |
|---|---|---|
| 67,719 | Burr | Aug. 13, 1867 |
| 835,100 | Devine | Nov. 6, 1906 |
| 909,342 | Smith | Jan. 12, 1909 |
| 1,013,046 | Murphy | Dec. 26, 1911 |
| 1,969,736 | Erling | Aug. 14, 1934 |
| 1,982,711 | Vickers | Dec. 4, 1934 |
| 2,123,552 | Helwig | July 12, 1938 |
| 2,720,691 | Kuniholm | Oct. 18, 1955 |
| 2,754,574 | Clarke et al. | July 17, 1956 |

FOREIGN PATENTS

| | | |
|---|---|---|
| 55,569 | Canada | Apr. 8, 1958 |